US006777876B2

United States Patent

Kobayashi et al.

(10) Patent No.: US 6,777,876 B2
(45) Date of Patent: Aug. 17, 2004

(54) POWER-SUPPLY UNIT FOR MICROWAVE TUBE

(75) Inventors: Junichi Kobayashi, Kanagawa (JP); Takuichi Tsuchiya, Kanagawa (JP); Junichi Matsuoka, Kanagawa (JP)

(73) Assignee: NEC Microwave Tube, Ltd., Kanagawa (JP)

( * ) Notice: Subject to any disclaimer, the term of this patent is extended or adjusted under 35 U.S.C. 154(b) by 0 days.

(21) Appl. No.: 10/400,892

(22) Filed: Mar. 27, 2003

(65) Prior Publication Data

US 2003/0184232 A1 Oct. 2, 2003

(30) Foreign Application Priority Data

Mar. 29, 2002 (JP) ....................................... 2002-096007

(51) Int. Cl.[7] .......................... H01J 25/34; H02H 9/00; H05B 6/66

(52) U.S. Cl. ............................ 315/3.5; 315/3.6; 315/5; 361/54; 361/52; 361/42; 219/715; 219/716; 219/723

(58) Field of Search ............................. 315/3.5, 3.6, 5, 315/500; 361/54, 52, 42, 58, 55, 56, 90, 91; 219/715, 716, 717, 723

(56) References Cited

U.S. PATENT DOCUMENTS 3,596,209 A * 7/1971 Picard ......................... 330/43
3,636,476 A * 1/1972 Milberger ................... 327/181
3,760,285 A * 9/1973 Milberger et al. ............. 315/4
4,041,267 A * 8/1977 Wechsler ..................... 219/718
4,323,853 A * 4/1982 Kurokawa ................... 330/43
5,162,965 A * 11/1992 Milberger et al. ............ 361/56
6,111,358 A * 8/2000 Cardwell et al. ............ 315/3.5

FOREIGN PATENT DOCUMENTS

JP 04-129132 9/1990

* cited by examiner

*Primary Examiner*—Tuyet T. Vo
(74) *Attorney, Agent, or Firm*—Michael Best & Friedrich LLP

(57) ABSTRACT

In a power-supply unit for a microwave tube, voltage between a helix power supply terminal and a cathode power supply terminal is divided into voltage slightly lower than the voltage of a collector power supply terminal. Uni-directional conductive means is provided between a voltage dividing point and the collector power supply terminal, and when the voltage of the collector power supply terminal is about to be lower than voltage at the voltage dividing point while the voltage approximates the voltage of the cathode power supply terminal, the uni-directional conductive means conducts and clamps the voltage of the collector power supply terminal so that the voltage is substantially equal to the voltage at the voltage dividing point.

9 Claims, 6 Drawing Sheets

POWER-SUPPLY UNIT FOR MICROWAVE TUBE

BACKGROUND OF THE INVENTION

1. Field of the Invention

The present invention relates to a power-supply unit for a microwave tube that supplies high tension power to a klystron, a traveling-wave tube and others, particularly relates to a power-supply unit for a microwave tube for preventing the breakdown of a microwave tube when power supply is turned off.

2. Description of the Prior Art

Heretofore, this type of power-supply unit for a microwave tube is disclosed in Japanese published unexamined patent application No. Hei4-129132. FIG. 1 is a block diagram showing a conventional type power-supply unit for a microwave tube. As shown in FIG. 1, a collector power source 61 is connected between a cathode power supply terminal 64 and a collector power supply terminal 65 and supplies voltage to be applied to a cathode electrode to a collector electrode of a microwave tube (not shown) A helix power source 62 is connected between the collector power supply terminal 65 and a helix power supply terminal 66 and supplies a helix electrode of the microwave tube with more potential than potential which the collector power source 61 supplies. A helix current detecting circuit 63 is inserted before the helix power supply terminal 66. The collector power source 61 and the helix power source 62 are respectively formed by a step-up transformer for boosting input voltage so that the voltage is high voltage of 1 kV or more, a switching inverter and a rectifier composed of a diode bridge and a smoothing capacitor for rectifying boosted voltage so that the voltage becomes d.c. voltage, and it is general that primary winding of the step-up transformer and the input side of the switching inverter are common.

Further, a voltage controlling element 68 is connected in parallel with the helix power source 62, in other words, between the collector power supply terminal 65 and the output terminal 67 of the helix power source 62, and the clamp voltage of the voltage controlling element 68 is set to withstand voltage or less between the helix electrode and the collector electrode of the microwave tube connected to the helix power supply terminal 66 and the collector power supply terminal 65.

For impedance between each electrode of the microwave tube viewed from the side of the power-supply unit, in case the respective electrodes of the microwave tube are connected to each power supply terminal of such a power-supply unit, impedance between the collector electrode and the cathode electrode is smaller than impedance between the helix electrode and the cathode electrode. Therefore, in a sequence in which the collector power source 61 and the helix power source 62 are simultaneously turned off, the voltage of a collector approximates the voltage of a cathode earlier than the voltage of a helix and difference between the voltage of the helix and the voltage of the collector is excessive. When the difference exceeds the clamp voltage of the voltage controlling element 68, the voltage controlling element 68 conducts and limits difference in voltage between the helix electrode and the collector electrode so that the difference is a set value or smaller so as to prevent the breakdown of the microwave tube.

However, as withstand voltage of 1 kV or more is required in case a varistor and Zener diode are used for the voltage controlling element 68, multiple elements are required to be connected in series and there is a defect that the unit cannot be miniaturized.

SUMMARY OF THE INVENTION

The object of the invention is to provide a power source for a microwave tube in which in a power turn-off sequence, difference in voltage between a helix electrode and a collector electrode of a connected microwave tube can be limited and further, difference in voltage between a cathode electrode and the collector electrode can be limited so as to prevent the breakdown of the microwave tube. Another object is to provide the power source for the microwave tube suitable for miniaturization.

To solve the problem, the invention is based upon a power-supply unit for a microwave tube provided with a helix power supply terminal, a collector power supply terminal and a cathode power supply terminal for supplying power to a helix electrode, a collector electrode and a cathode electrode respectively of the microwave tube and is characterized in that potential dividing means is provided between the helix power supply terminal and the cathode power supply terminal and a potential dividing point of the potential dividing means and the collector power supply terminal are connected via uni-directional conductive means.

The potential dividing means is a capacitor connected in series. Besides, the invention is also characterized in that the uni-directional conductive means is at least one diode the anode of which is connected to the potential dividing point of the potential dividing means and the cathode of which is connected to the collector power supply terminal.

It is desirable that voltage at the potential dividing point of the potential dividing means when the power-supply unit is operated is lower than the voltage of the collector power supply terminal.

The power-supply unit for a microwave tube according to the invention is also characterized in that at least first impedance means and second impedance means are connected in series between the helix power supply terminal and the cathode power supply terminal and the cathode power supply terminal and uni-directional conductive means is connected between a node of the first impedance means and the second impedance means and the collector power supply terminal.

The first and second impedance means can be formed by a capacitor. At least either of the first or second impedance means can be formed by a capacitor and a resistor connected to the capacitor in parallel.

The uni-directional conductive means can be formed by at least one diode the anode of which is connected to a node of the first impedance means and the second impedance means and the cathode of which is connected to the collector power supply terminal. Further, voltage at the node of the first impedance means and the second impedance means can be made lower than the potential of the collector power supply terminal.

DETAILED DESCRIPTION OF THE PREFERRED EMBODIMENTS

Figure 1:
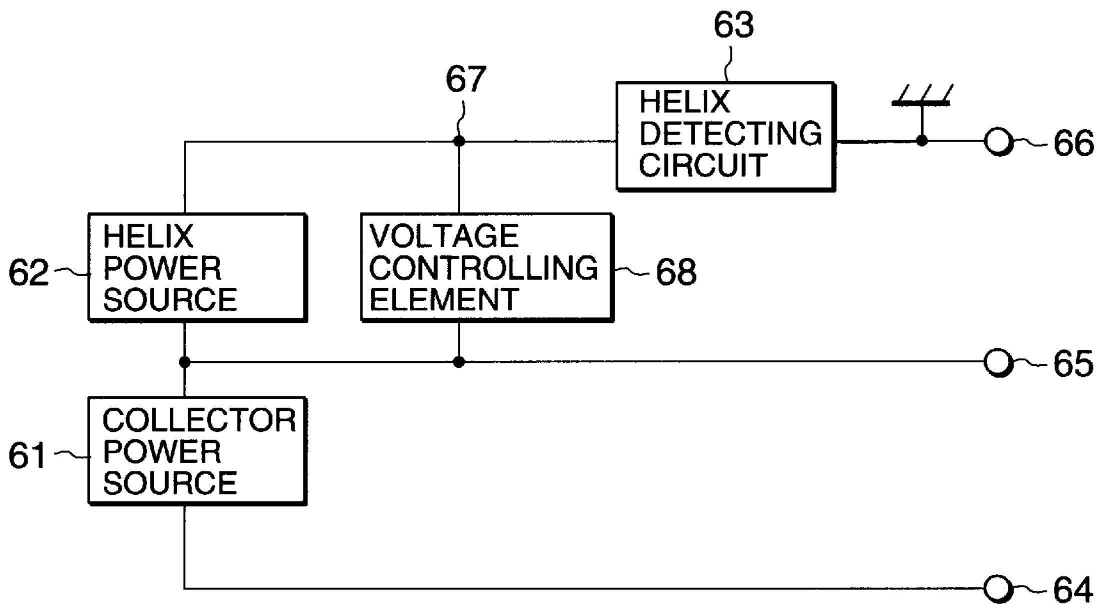
FIG.1 (PRIOR ART)
FIG. 1 is a block diagram showing a conventional type power-supply unit for a microwave tube.

Referring to the drawings, embodiments of the invention will be described below.

Figure 2:
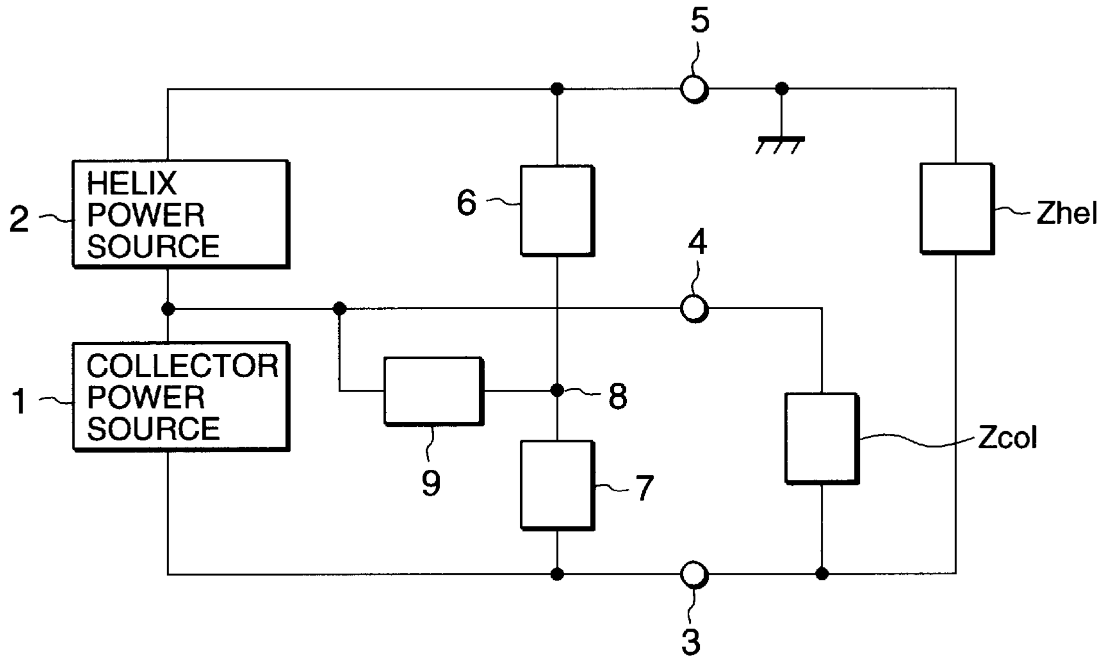
FIG. 2 is a block diagram showing an embodiment of a power-supply unit for a microwave tube according to the invention.

FIG. 2 is a block diagram showing a power-supply unit for a microwave tube equivalent to one embodiment of the invention. A collector power source 1 that supplies power to a cathode electrode, a collector electrode and a helix electrode of a microwave tube (not shown) respectively via a cathode power supply terminal 3, a collector power supply terminal 4 and a helix power supply terminal 5 is connected between the cathode power supply terminal 3 and the collector power supply terminal 4. A helix power source 2 is connected between the collector power supply terminal 4 and the helix power supply terminal 5.

First and second impedance means 6 and 7 as potential dividing means for dividing voltage between the cathode power supply terminal 3 and the helix power supply terminal 5 are connected between both power supply terminals in series. Uni-directional conductive means 9 is connected between a potential dividing point 8 provided between these means and the collector power supply terminal 4. The impedance of the impedance means 6 and 7 is selected so that voltage at the potential dividing point 8 is substantially equal to that of the collector power supply terminal 4 when the microwave tube is operated and reverse bias is applied to the uni-directional conductive means.

In such a power-supply unit, it is general that the voltage of the helix power supply terminal is used for ground potential (0 V) and negative voltage is applied to the collector power supply terminal and the cathode power supply terminal.

In FIG. 2, impedance Zcol between the collector electrode and the cathode electrode of the microwave tube connected to this power-supply unit and impedance Zhel between the helix electrode and the cathode electrode are schematically shown, and impedance Zcol between the collector electrode and the cathode electrode is smaller than impedance Zhel between the helix electrode and the cathode electrode. As impedance between the helix electrode and the collector electrode is very large, compared with impedance described above, it is omitted.

Figure 3:
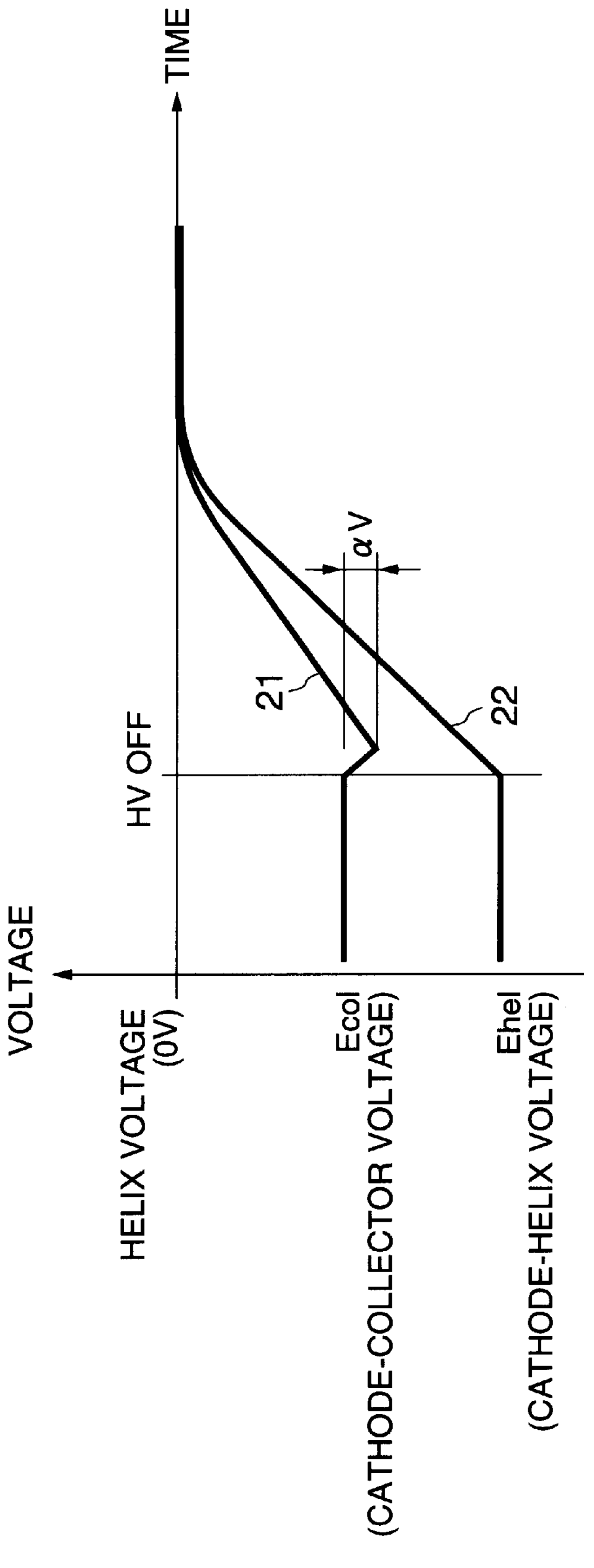
FIG. 3 shows a waveform of voltage when high voltage is turned off in the embodiment of the power-supply unit for a microwave tube according to the invention.

In this power-supply circuit, as shown in FIG. 3, after the collector power source 1 and the helix power source 2 are simultaneously turned off, the voltage 21 of approximately −5 kV of the collector power supply terminal 4 approximates the voltage 22 of approximately −10 kV of the cathode power supply terminal 3 because impedance Zcol between the collector electrode and the cathode electrode (that is, voltage Ecol between the collector electrode and the cathode electrode) is smaller than impedance Zhel between the helix electrode and the cathode electrode (that is, voltage Ehel between the cathode electrode and the helix electrode). However, when the voltage 21 of the collector power supply terminal 4 reduces by $\alpha$V and turns lower than voltage at the potential dividing point 8 between the potential dividing means 6, 7 connected between the cathode power supply terminal 3 and the helix power supply terminal 5, the uni-directional conductive means 9 connected between the potential dividing point 8 and the collector power supply terminal 4 conducts, the voltage 21 of the collector power supply terminal 4 is clamped so that the voltage 21 is substantially equal to voltage at the potential dividing point 8 between the helix electrode and the cathode electrode (lower by the quantity of the fall of potential of the uni-directional conductive means 9) and afterward, the state continues until the voltage 21 turns equal to the voltage of the helix power supply terminal 4.

Hereby, excessive voltage can be prevented from being applied between the helix electrode and the collector electrode of the microwave tube connected to the power-supply unit when high voltage power supply is turned off.

As for voltage applied to both ends of the uni-directional conductive means 9, voltage at the potential dividing point 8 is also substantially equal to the voltage of the collector power supply terminal 4 when the traveling-wave tube is operated, the uni-directional conductive means does not require high withstand voltage and as multiple elements are not required to be connected in series to increase withstand voltage, miniaturization can be attained.

(First Embodiment)

Figure 4:
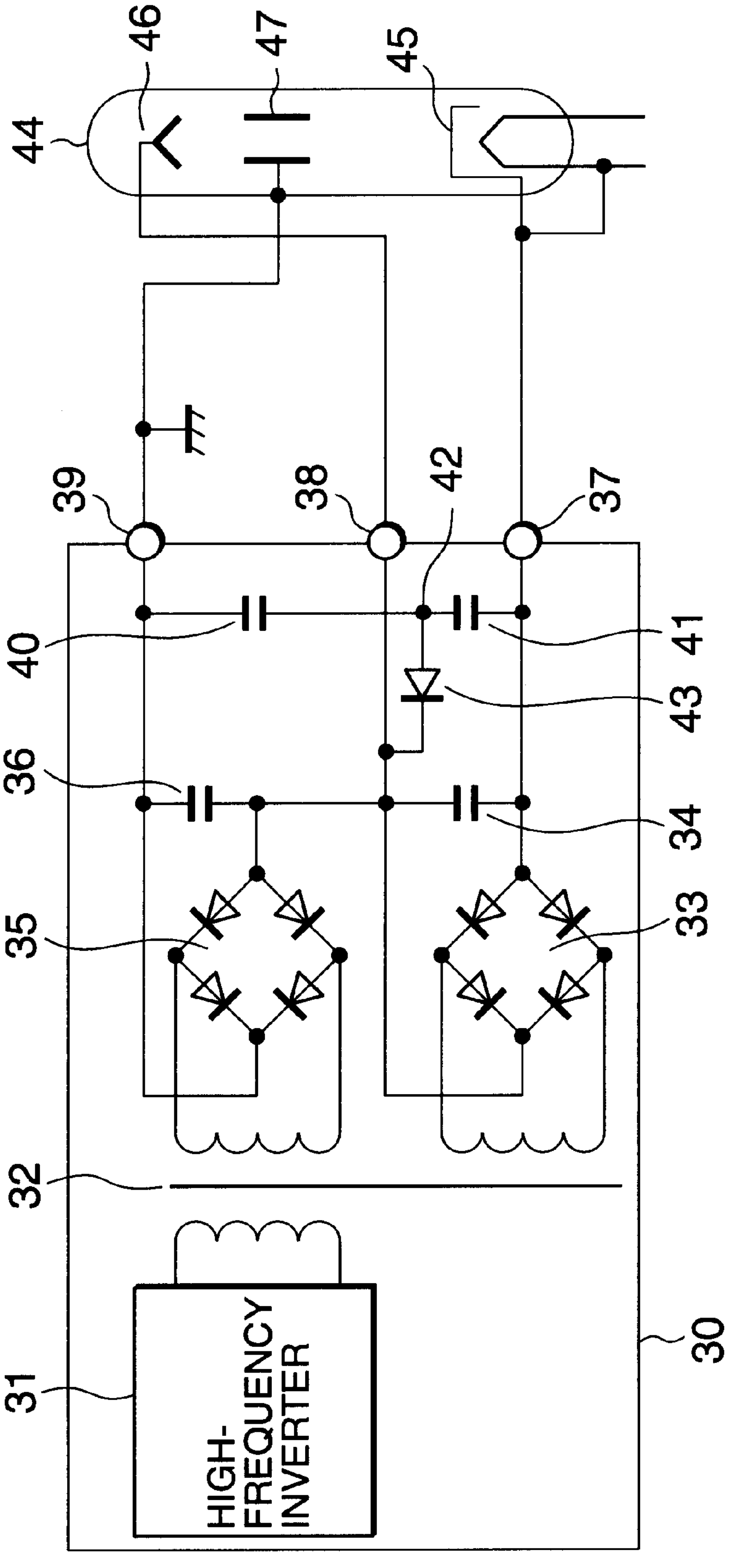
FIG. 4 is a circuit diagram showing a first embodiment of the power-supply unit for a microwave tube according to the invention.

A first embodiment of the invention will be described. FIG. 4 is a circuit diagram showing a power-supply unit for a microwave tube 30 equivalent to one embodiment of the invention. For one example of the microwave tube, a traveling-wave tube 44 is schematically connected and the power-supply unit 30 supplies power to a cathode electrode 45, a collector electrode 46 and a helix electrode 47 of the traveling-wave tube 44 respectively via a cathode power supply terminal 37, a collector power supply terminal 38 and a helix power supply terminal 39. A collector power source is composed of a high-frequency inverter 31 that converts input d.c. voltage to alternating voltage, a step-up transformer 32 that inputs the alternating voltage to a primary winding and boosts it to 1 kV or more, a diode bridge 33 connected a first secondary winding of the step-up transformer 32 and a smoothing capacitor 34, and the collector power source is connected between the cathode power supply terminal 37 and the collector power supply terminal 38. A helix power source is composed of the high-frequency inverter 31, the step-up transformer 32, a diode bridge 35 connected to a second secondary winding of the step-up transformer 32 and a smoothing capacitor 36 and is connected between the collector power supply terminal 38 and the helix power supply terminal 39.

Capacitors 40 and 41 are connected in series between the cathode power supply terminal 37 and the helix power supply terminal 39 as impedance means of potential dividing means that divides voltage between both power supply terminals. A diode 43 as uni-directional conductive means is connected between a potential dividing point 42 which is a node of series connection and the collector power supply terminal 38 so that the side of the potential dividing point 42 is an anode. In such a power-supply unit, it is general as described above that the voltage of the helix power supply terminal 39 is used for ground potential (0 V) and negative voltage is applied to the collector power supply terminal 38 and the cathode power supply terminal 37. When the traveling-wave tube is operated, approximately −10 kV is applied to the cathode power supply terminal 37, approximately −5 kV is applied to the collector power supply terminal 38, and the capacitance ratio of the capacitor 40 to the capacitor 41 is selected so that voltage at the potential dividing point 42 is slightly lower than the voltage of the collector power supply terminal 38, that is, so that reverse bias is applied to the diode 43. For a desirable example, as voltage between the helix power supply terminal 39 and the collector power supply terminal 38 is set to −5 kV if the capacity of the capacitor 40 is 0.1 $\mu$F and the capacity of the capacitor 41 is 0.2 $\mu$F, voltage between the helix power supply terminal 39 and the potential dividing point 42 is −6.7 kV and reverse bias is applied to the diode 43.

In this power-supply circuit, as described above, as impedance between the collector electrode and the cathode electrode is smaller than impedance between the helix electrode and the cathode electrode after the collector power source and the helix power source are both turned off, the voltage of approximately −5 kV of the collector power supply terminal approximates the voltage of approximately −10 kV of the cathode power supply terminal as shown in FIG. 3. However, when the voltage of the collector power supply terminal 38 is lower than voltage at the potential dividing point 42 between the potential dividing means 40 and 41 connected between the cathode power supply terminal 37 and the helix power supply terminal 39, the diode 43 as uni-directional connecting means connected between the potential dividing point 42 and the collector power supply terminal 38 conducts, and the voltage of the collector power supply terminal 38 is clamped so that the voltage is substantially equal to voltage at the potential dividing point 42 between the helix electrode and the cathode electrode (is lower by the quantity of the fall of potential of the diode 43). Afterward, the state continues until the voltage of the collector power supply terminal is equal to that of the helix power supply terminal 39.

Hereby, excessive voltage can be prevented from being applied between the helix electrode and the collector electrode of the microwave tube connected to the power-supply unit when high voltage power supply is turned off.

As for voltage applied to both ends of the diode 43, voltage at the potential dividing point 42 is also substantially equal to the voltage of the collector power supply terminal 38 when the traveling-wave tube is operated, the diode does not require high withstand voltage and as multiple elements are not required to be connected in series to increase withstand voltage, miniaturization can be attained.

For the diode 43, only one is shown in FIG. 4, however, plural diodes may be also connected in parallel, may be also connected in series and diodes connected in parallel may be also connected in series. For a diode, not only a PN diode but Zener diode may be also used and a diode has only to be a uni-directional conductive device.

(Second Embodiment)

Figure 5:
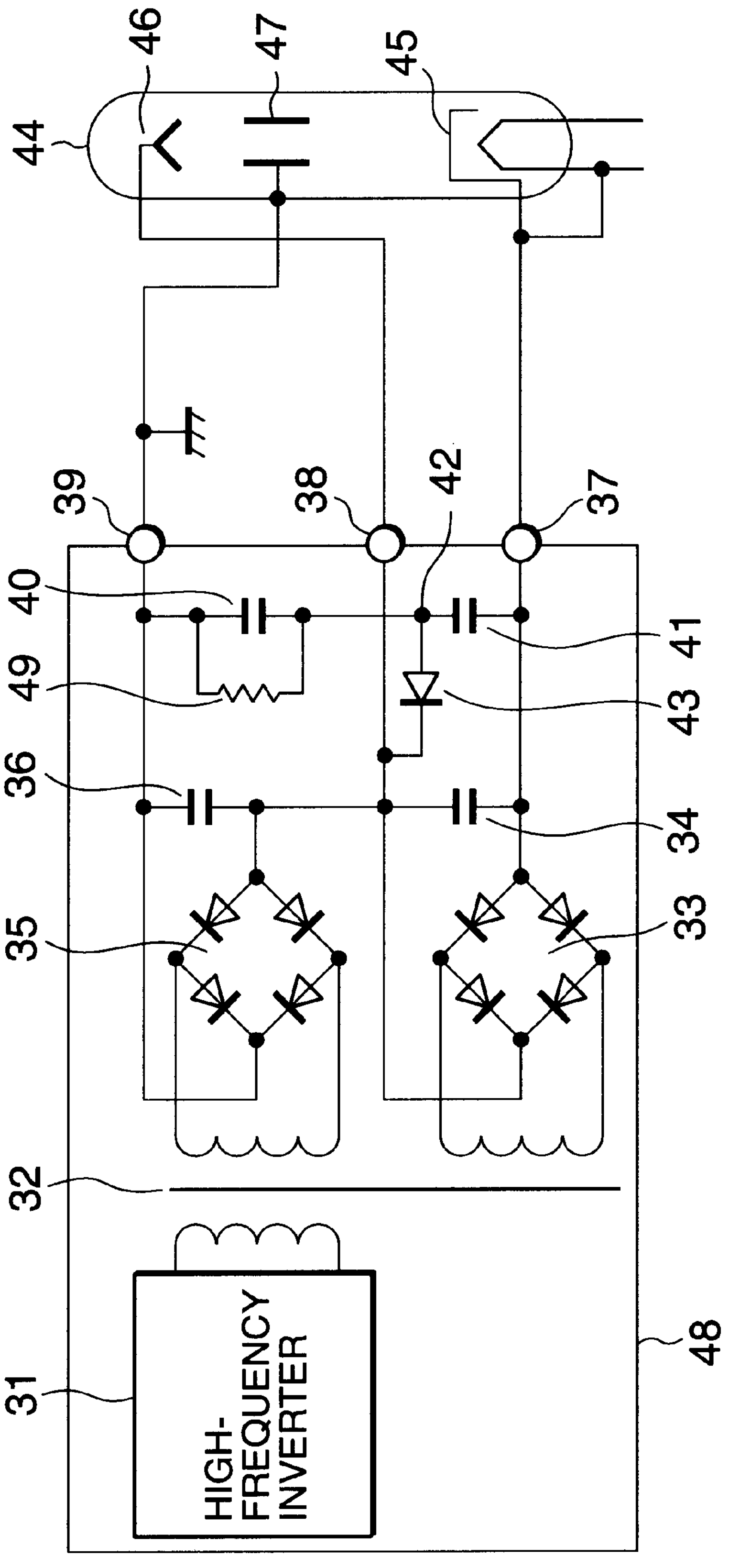
FIG. 5 is a circuit diagram showing a second embodiment of the power-supply unit for a microwave tube according to the invention.

A second embodiment of the invention will be described. FIG. 5 is a circuit diagram showing a power-supply unit for a microwave tube 48 equivalent to the second embodiment of the invention. The same reference number is allocated to the same part as that in the first embodiment. The second embodiment is different from the first embodiment in that out of capacitors 40 and 41 as impedance means for dividing potential connected between a cathode power supply terminal 37 and a helix power supply terminal 39, a resistor 49 is connected to the capacitor 40 between the helix power supply terminal 39 and a potential dividing point 42 in parallel. The capacitance ratio of the capacitor 40 to the capacitor 41 and a value of the resistor 49 are selected so that voltage at the potential dividing point 42 is slightly lower than the voltage of a collector power supply terminal 38, that is, reverse bias is applied to a diode 43. As voltage at the potential dividing point 42 can approximate earlier by quantity in which impedance is smaller owing to the resistor 49, compared with the first embodiment in which voltage at the potential dividing point 42 approximates the voltage of a helix in proportion to the voltage of the cathode power supply terminal after a collector power source and a helix power source are both turned off, the voltage of the collector power supply terminal can be early clamped. For example, if each capacity of the capacitors 40 and 41 is 0.1 $\mu$F and 0.2 $\mu$F as in the first embodiment and the resistance value of the resistor 49 is 20 MΩ, the similar operation to that in the first embodiment is acquired.

(Third Embodiment)

Figure 6:
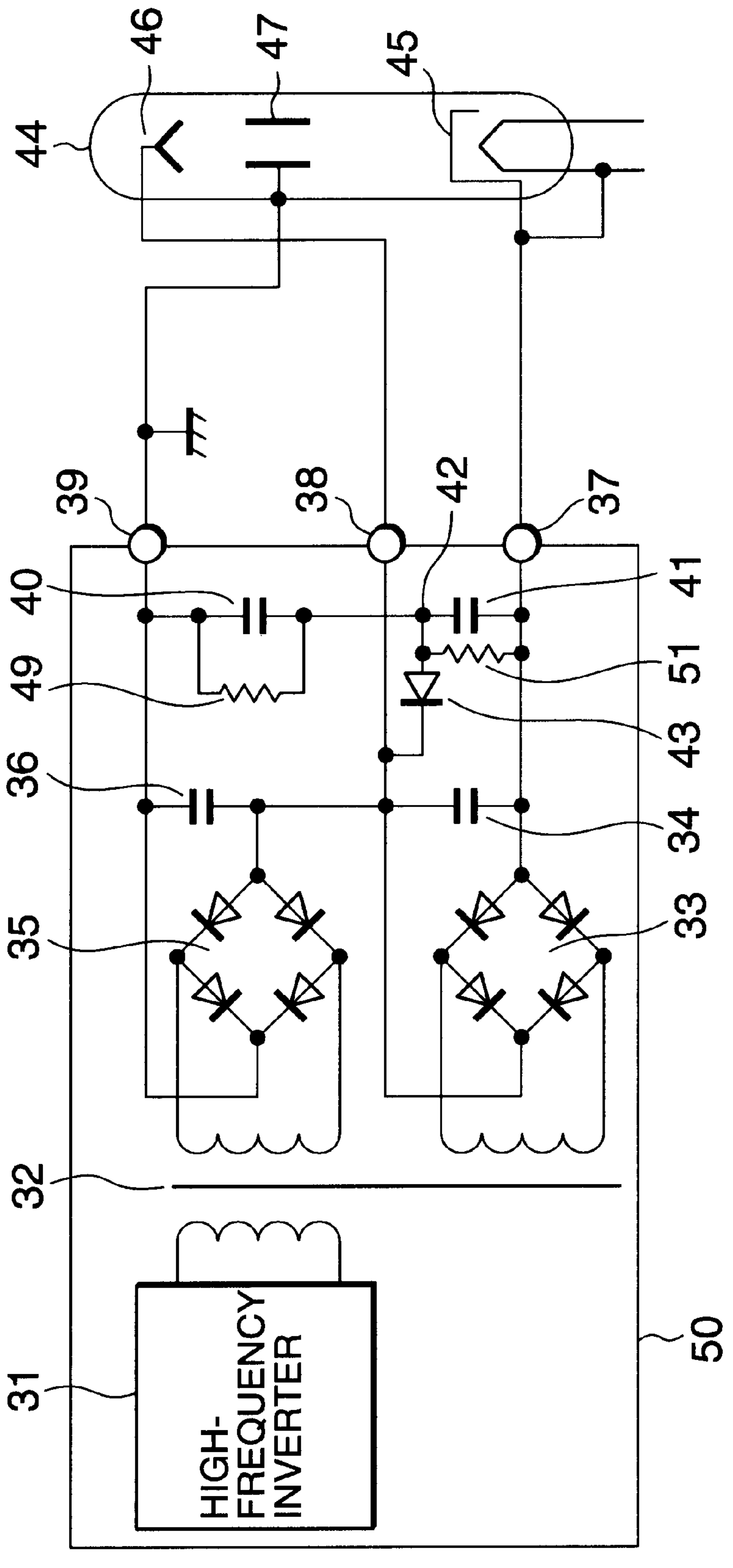
FIG. 6 is a circuit diagram showing a third embodiment of the power-supply unit for a microwave tube according to the invention.

A third embodiment of the invention will be described. FIG. 6 is a circuit diagram showing a power-supply unit for a microwave tube 50 equivalent to the third embodiment of the invention. The same reference number is allocated to the same part as that in the first embodiment. The third embodiment is different from the first embodiment in that a resistor 49 is connected a capacitor 40 between a helix power supply terminal 39 and a potential dividing point 42 in parallel out of capacitors 40 and 41 as impedance means for dividing potential connected between a cathode power supply terminal 37 and the helix power supply terminal 39 and a resistor 51 is connected to the capacitor 41 between the potential dividing point 42 and the cathode power supply terminal 37 in parallel. The values of the resistor 49 and the resistor 51 are selected so that voltage at the potential dividing point 42 is slightly lower than the voltage of the collector power supply terminal 38, that is, reverse bias is applied to a diode 43.

In the first embodiment, as voltage at the potential dividing point 42 which is potential dividing means is determined by selecting the capacitance ratio of the capacitor 40 to the capacitor 41, the voltage is not divided precisely when the insulation resistance values of the capacitors disperse and in operation, bias in a forward direction may be applied to the diode 43, however, in the power-supply unit equivalent to this embodiment, voltage at the potential dividing point 42 can be determined precisely based upon the values of the resistors 49 and 51. That is, voltage at the potential dividing point 42 is strictly related to not only the values of the resistors 49 and 51 but the insulation resistance values of the capacitors 40 and 41, however, as the insulation resistance values are larger by one digit or more, compared with the values of the resistors 49 and 51, they can be ignored and more precise voltage can be acquired by resistive potential division by the resistors 49 and 51 than potential division by the capacitance ratio of the capacitor 40 to the capacitor 41. For example, if each capacity of the capacitors 40 and 41 is 0.1 $\mu$F and 0.2 $\mu$F as in the first embodiment, the resistance value of the resistor 49 is 20 MΩ and the resistance value of the resistor 51 is 10 MΩ, the similar operation to that in the first embodiment is acquired.

Further, owing to the resistors 49 and 51, after a collector power source and a helix power source are simultaneously turned off, the voltage of the cathode power supply terminal earlier approximates the voltage of a helix by quantity in which impedance is lower, compared with that in the first embodiment and the voltage of the collector power supply terminal can be also early clamped.

As described above, according to the invention, the power source for the microwave tube in which difference in voltage between the helix electrode and the collector electrode of the microwave tube connected in a sequence after power supply is turned off can be limited to a predetermined value promptly and precisely and the breakdown of the microwave tube can be prevented can be acquired.

Besides, effect that as multiple parts are not required to be used, the power source for the microwave tube can be miniaturized is also produced.

What is claimed is:

1. A power-supply unit for a microwave tube, comprising:

a helix power supply terminal for supplying power to a helix electrode of said microwave tube;

a collector power supply terminal for supplying power to a collector electrode of said microwave tube;

a cathode power supply terminal for supplying power to a cathode electrode of said microwave tube; and potential dividing means provided between said helix power supply terminal and said cathode power supply terminal, a potential dividing point of said potential dividing means being connected to said collector power supply terminal via uni-directional conductive means.

2. A power-supply unit for a microwave tube according to claim 1, wherein said potential dividing means is a capacitor connected in series.

3. A power-supply unit for a microwave tube according to claim 1, wherein said uni-directional conductive means is at least one diode having an anode and a cathode such that said anode is connected to the potential dividing point of the potential dividing means and said cathode is connected to said collector power supply terminal.

4. A power-supply unit for a microwave tube according to claim 1, wherein voltage at said potential dividing point of said potential dividing means when said power-supply unit is operated is lower than the voltage of said collector power supply terminal.

5. A power-supply unit for a microwave tube, comprising:

a helix power supply terminal for supplying power to a helix electrode of said microwave tube;

a collector power supply terminal for supplying power to a collector electrode of said microwave tube;

a cathode power supply terminal for supplying power to a cathode electrode of said microwave tube;

at least first impedance means and second impedance means connected in series between said helix power supply terminal and said cathode power supply terminal; and uni-directional conductive means connected between said collector power supply terminal and a node of said first impedance means and said second impedance means.

6. A power-supply unit for a microwave tube according to claim 5, wherein said first impedance means and said second impedance means are formed by a capacitor.

7. A power-supply unit for a microwave tube according to claim 5, wherein at least either of said first impedance means or said second impedance means is formed by using a capacitor and a resistor connected in parallel with said capacitor.

8. A power-supply unit for a microwave tube according to claim 5, wherein said uni-directional conductive means is at least one diode having an anode and a cathode such that said anode is connected to a node of said first impedance means and said second impedance means and said cathode is connected to said collector power supply terminal.

9. A power-supply unit for a microwave tube according to claim 5, wherein a voltage at said node of said first impedance means and said second impedance means when said power-supply unit is operated is lower than a voltage of said collector power supply terminal.

* * * * *